United States Patent
Wiacek

(10) Patent No.: US 12,481,757 B2
(45) Date of Patent: Nov. 25, 2025

(54) USING FILES OF INTEREST TO IDENTIFY SIMILAR FILES CONTAINED IN A CORPUS OF FILES

(71) Applicant: Stairwell, Inc., Mountain View, CA (US)

(72) Inventor: Michael Joseph Wiacek, Santa Clara, CA (US)

(73) Assignee: Stairwell, Inc., Mountain View, CA (US)

( * ) Notice: Subject to any disclaimer, the term of this patent is extended or adjusted under 35 U.S.C. 154(b) by 188 days.

(21) Appl. No.: 18/315,649

(22) Filed: May 11, 2023

(65) Prior Publication Data
US 2023/0394147 A1    Dec. 7, 2023

Related U.S. Application Data

(60) Provisional application No. 63/348,957, filed on Jun. 3, 2022.

(51) Int. Cl.
*G06F 21/00*      (2013.01)
*G06F 21/56*      (2013.01)

(52) U.S. Cl.
CPC ...... *G06F 21/565* (2013.01); *G06F 2221/034* (2013.01)

(58) Field of Classification Search
CPC ......................... G06F 2221/034; G06F 21/565
USPC ....................................................... 726/23
See application file for complete search history.

(56) References Cited

U.S. PATENT DOCUMENTS

| | | | | |
|---|---|---|---|---|
| 10,482,250 | B1 * | 11/2019 | Joshi | G06F 21/55 |
| 11,288,368 | B1 * | 3/2022 | Wesson | G06F 21/64 |
| 2013/0145471 | A1 | 6/2013 | Richard et al. | |
| 2015/0128274 | A1 * | 5/2015 | Giokas | H04L 51/212 726/23 |
| 2019/0007436 | A1 | 1/2019 | Dods | |
| 2020/0342172 | A1 * | 10/2020 | Cai | G06N 3/044 |
| 2023/0185915 | A1 * | 6/2023 | Rao | G06F 21/566 726/22 |

(Continued)

FOREIGN PATENT DOCUMENTS

| | | | | |
|---|---|---|---|---|
| CN | 108399162 A | * | 8/2018 | ............. G06F 16/35 |
| DE | 10112587 A1 | * | 9/2002 | ........ G06F 16/90344 |
| EP | 3959633 A1 | * | 3/2022 | ........... G06F 11/1458 |

OTHER PUBLICATIONS

USPTO—International Search Report and Written Opinion mailed on Aug. 25, 2023 for related International Appl. No. PCT/US2022/0423692, 11 pgs.

*Primary Examiner* — Josnel Jeudy
(74) *Attorney, Agent, or Firm* — McDermott Will & Schulte LLP

(57) ABSTRACT

Methods, systems, and storage media for using files of interest to identify similar files are disclosed. Exemplary implementations may: generate a corpus of files including a plurality of files, the plurality of files being received from a plurality of sources; store a single copy of each of the plurality of files in a data store; identify a first file of interest; compare the first file of interest to at least a portion of the plurality of files comprising the corpus of files; based on the comparing, identify at least a second file of interest, from the plurality of files comprising the corpus of files, that includes a threshold similarity to the first file of interest; and cause an identifier of the second file of interest to be displayed.

18 Claims, 5 Drawing Sheets

(56) References Cited

U.S. PATENT DOCUMENTS

2024/0419704 A1* 12/2024 Rossillo .............. G06F 16/3335

* cited by examiner

USING FILES OF INTEREST TO IDENTIFY SIMILAR FILES CONTAINED IN A CORPUS OF FILES

CROSS-REFERENCE TO RELATED APPLICATIONS

The present disclosure is related and claims priority under 35 USC § 119(e), to U.S. Prov. Pat. Appln. No. 63/348,957, to Michael J. WIACEK, entitled USING FILES OF INTEREST TO IDENTIFY SIMILAR FILES CONTAINED IN A CORPUS OF FILES, filed on Jun. 3, 2022, the contents of which are hereby incorporated by reference in their entirety, for all purposes.

TECHNICAL FIELD

The present disclosure generally relates to Internet security. More particularly, the present disclosure relates to using files of interest to identify files contained in a pre-collected corpus of files that have identical and/or similar features.

BACKGROUND

Computer security is a growing need in today's increasingly computer-reliant society. The computer security industry as a whole strives to identify and neutralize threats to computer security before such threats mature into security breaches.

SUMMARY

The subject disclosure provides systems and methods for using files of interest to identify similar files contained in a pre-collected corpus of files. In some aspects, files of interest may be identified via a security product alert, a threat intel feed, a YARA rule match, or the like. In some aspects, files of interest and/or files having identical and/or similar features to files of interest may be suspicious and/or malicious files.

One aspect of the present disclosure relates to a computer-implemented method for using files of interest to identify similar files. The method may include generating a corpus of files including multiple files received from multiple sources. The method may include storing a single copy of each of the files in a data storage. The method may include identifying, from the corpus of files, a first file of interest, and comparing the first file of interest to at least a portion of the files in the corpus of files. The method may include, based on the comparing, identifying a second file of interest, from the corpus of files, the second file of interest having a threshold similarity to the first file of interest. The method may include causing an identifier of the second file of interest to be displayed.

Another aspect of the present disclosure relates to a system configured for using files of interest to identify similar files. The system may include one or more hardware processors configured by machine-readable instructions. The processor(s) may be configured to generate a corpus of files including multiple files received from multiple sources. The processor(s) may be configured to store a single copy of each of the files in a data storage. The processor(s) may be configured to identify a first file that contains a character sequence of interest. The processor(s) may be configured to extract one or more features from the first file. The processor(s) may be configured to compare the one or more features from the first file to at least a portion of the files in the corpus of files. The processor(s) may be configured to identify at least a second file from the corpus of files that includes one or more of the extracted one or more features. The processor(s) may be configured to cause an identifier of the second file to be displayed.

Yet another aspect of the present disclosure relates to a non-transient computer-readable storage medium having instructions embodied thereon, the instructions being executable by one or more processors to perform a method for using files of interest to identify similar files. The method may include generating a corpus of files including multiple files received from multiple sources. The method may include storing a single copy of each of the files in a data storage. The method may include identifying a first file of interest in the corpus of files. The method may include comparing the first file of interest to at least a portion of the files in the corpus of files. The method may include, based on the comparing, identifying at least a second file of interest, from the files in the corpus of files, the second file of interest including a threshold similarity to the first file of interest. The method may include causing an identifier of the second file of interest to be displayed.

Still another aspect of the present disclosure relates to a system configured for using files of interest to identify similar files. The system may include means for generating a corpus of files including multiple files received from multiple sources. The system may include means for storing a single copy of each of the files in a data storage. The method may include means for identifying a first file that contains a character sequence of interest. The system may include means for extracting one or more features from the first file. The system may include means for comparing the one or more features from the first file to at least a portion of the files in the corpus of files. The system may include means for identifying at least a second file from the corpus of files that includes at least a portion of the extracted one or more features. The system may include means for causing an identifier of the second file to be displayed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
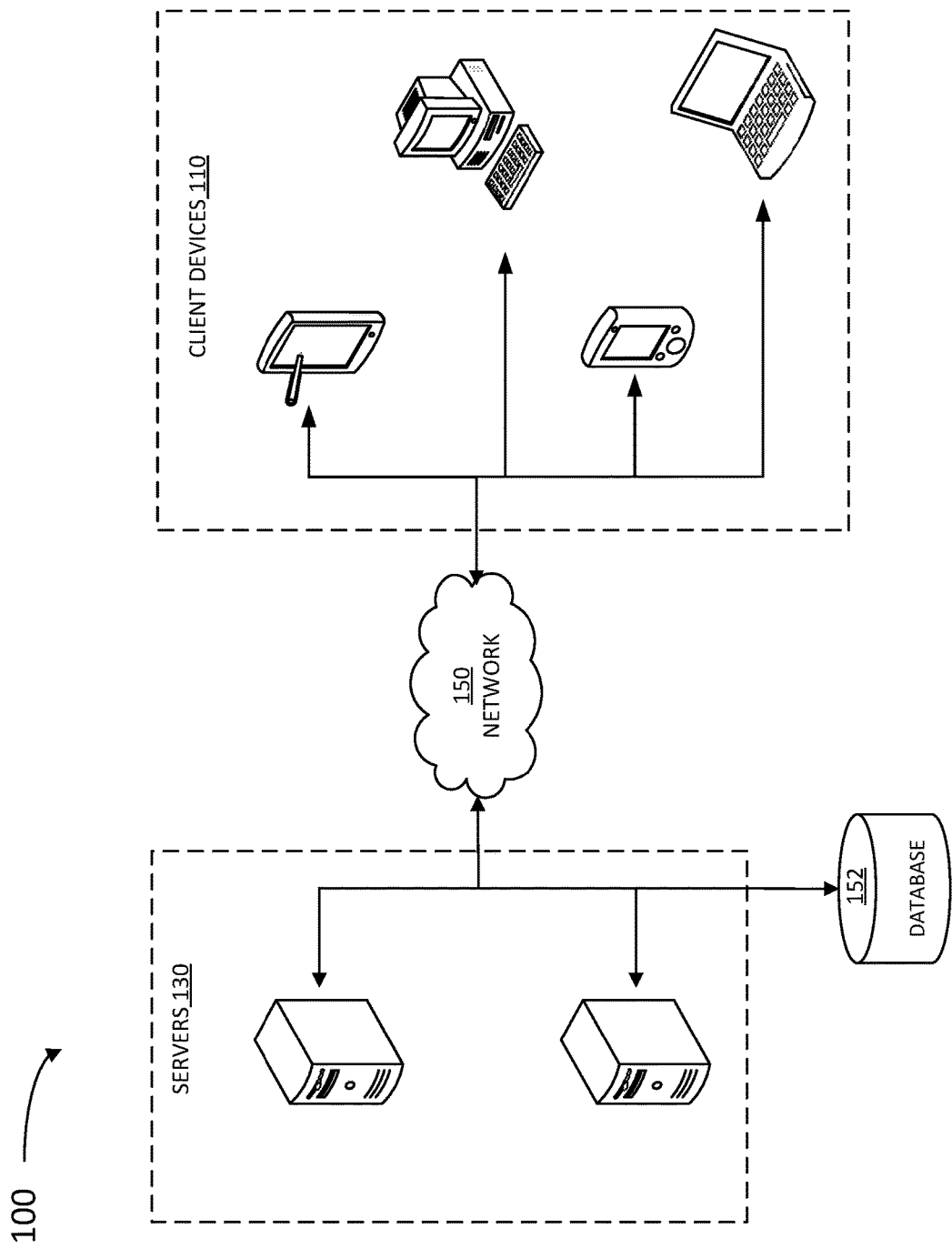
FIG. 1 illustrates an exemplary network architecture for implementing systems and methods consistent with the present disclosure, according to some embodiments.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Computer security is a growing concern in today's increasingly computer-reliant society. The computer security industry as a whole strives to identify and neutralize threats to computer security before such threats mature into security breaches. While there are many ways for identifying security threats, one exemplary way to identify potentially threatening files (e.g., malware), is through the use of YARA rules. YARA is a computing language that provides a way of identifying malware (or other files) by creating rules that look for certain characteristics. Utilizing YARA, a user writes a recipe or rule and evaluates suspicious files (or any files) against it, to determine whether the file matches the rule. Files matching the rules may then be considered malicious (or at least suspicious).

In accordance with embodiments of the present disclosure, a YARA rule (or other character sequence or feature of interest) is compared to a plurality of files within a corpus of files. Once one file in the corpus of files has been identified as containing the sequence/feature, or once a file containing a suspicious sequence has been identified, other files in the corpus of pre-collected files are compared to the identified file. A pre-selected similarity threshold between the other files and the identified file may indicate whether the other file(s) contain the originally suspicious sequence/feature. In some embodiments, finding a number of suspicious files below a pre-selected threshold may indicate that the source from which the files originate may be free of suspicious algorithms. Accordingly, embodiments of the present disclosure are able to identify suspicious and/or malicious files that were previously undetected and suspicious and/or malicious files that may not exist on one or more devices associated with a file source at the point in time that the analysis is conducted but still may present a current security threat.

Embodiments consistent with the present disclosure contemplate multiple ways in which a potentially threatening file may be initially identified including, by way of example and not limitation, via a security product alert, a threat intel feed, a YARA rule match, and the like. Once a file is identified as potentially threatening (or otherwise of interest), in accordance with embodiments hereof, the file itself may be utilized to determine if any files in a corpus of pre-collected files may be similar enough to that file to warrant further examination.

Example System Architecture

FIG. 1 illustrates an exemplary network architecture 100 for implementing systems and methods consistent with the present disclosure. Network architecture 100 includes one or more servers 130, at least one database 152, and multiple client devices 110, all the above communicatively coupled with one another via a network 150.

Servers 130 may provide a network service to users or customers handling client devices 110. Accordingly, client devices 110 may include mobile computing devices such as mobile phones, smartphones, palm/pad devices, or laptops, or a desktop computer. Network 150 can include, for example, any one or more of a local area tool (LAN), a wide area tool (WAN), the Internet, and the like. Further, network 150 can include, but is not limited to, any one or more of the following tool topologies, including a bus network, a star network, a ring network, a mesh network, a star-bus network, tree or hierarchical network, and the like.

By virtue of the interaction between servers 130, database 152, and client devices 110, multiple files are exchanged between storage locations and memory circuits in each of the above devices and systems. Some of these files may become corrupted in time, or may be vulnerable to attack by a malicious third party with access to network 150. For example, in some circumstances, a server 130 (e.g., a node in network 150) may become rogue or controlled by a malicious agent or malware. Accordingly, the malicious server 130 may become a source of malware, or pernicious software. To stop spreading malware throughout network 150, methods as disclosed herein act quickly to identify files of interest, and also the source of these files. Once a malicious server 130 is identified, it may be quarantined and put out of circulation in network 150 while a repair or corrective measure is taken. Eventually, the server 130 may be allowed to rejoin network 150 once a number of files generated therein are devoid of suspicious features, wherein the number is greater than a pre-selected threshold.

Figure 2:
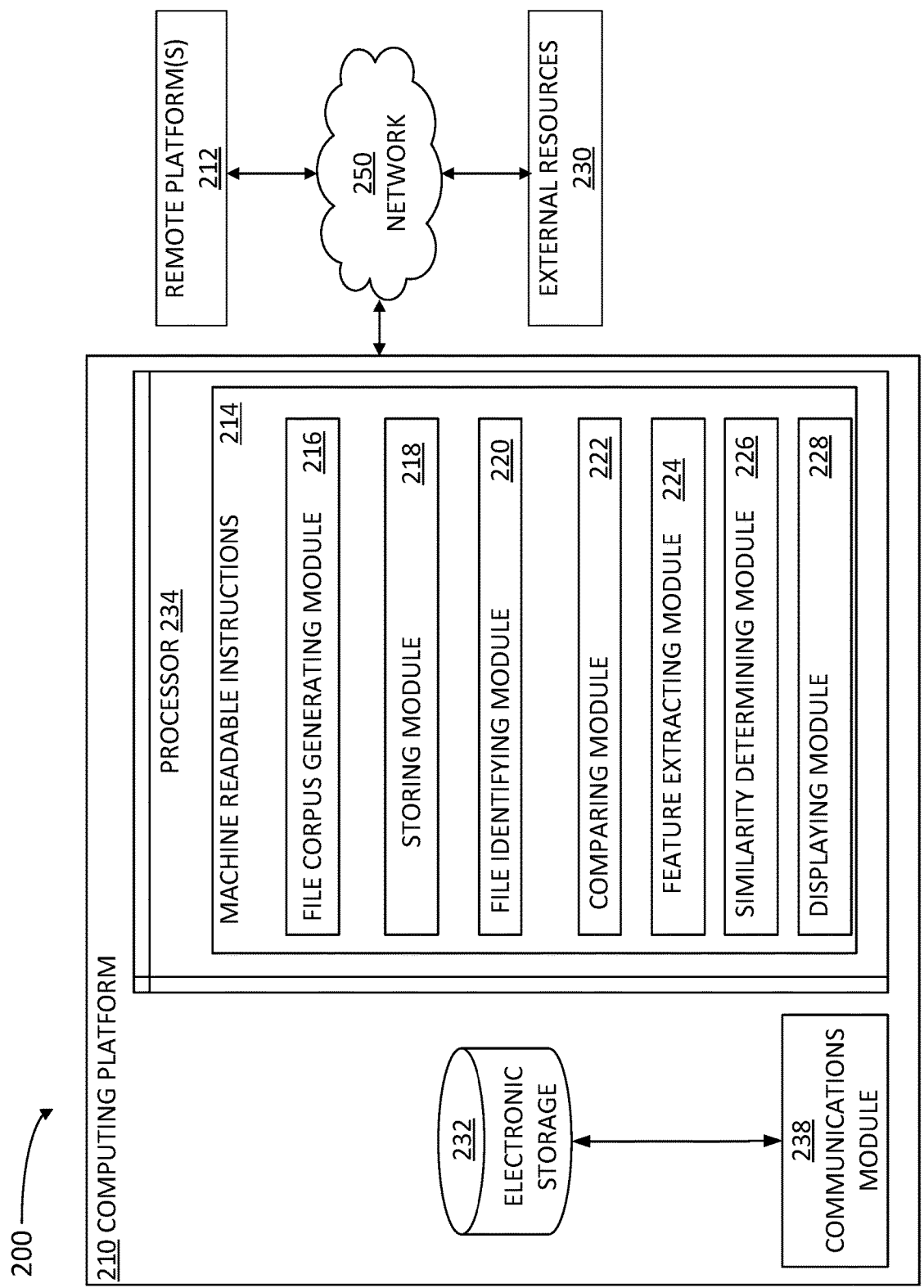
FIG. 2 illustrates a system configured for using files of interest to identify similar files contained in a pre-collected corpus of files, in accordance with one or more implementations of the present disclosure.

FIG. 2 illustrates a system 200 configured for using files of interest to identify similar files contained in a pre-collected corpus of files, according to certain aspects of the disclosure. In some implementations, system 200 may include one or more computing platforms 210. Computing platform(s) 210 may be configured to communicate with one or more remote platforms 212 according to a client/server architecture, a peer-to-peer architecture, and/or other architectures. Remote platform(s) 212 may be configured to communicate with other remote platforms via computing platform(s) 210 and/or according to a client/server architecture, a peer-to-peer architecture, and/or other architectures. Users may access system 200 via remote platform(s) 212.

Computing platform(s) 210 may be configured by machine-readable instructions 214. Machine-readable instructions 214 may include one or more instruction modules. The instruction modules may include computer program modules. The instruction modules may include one or more of file corpus generating module 216, storing module 218, file identifying module 220, comparing module 222, feature extracting module 224 similarity determining module 226, displaying module 228, and/or other instruction modules.

File corpus generating module 216 may be configured to generate a corpus of files including a plurality of files, the plurality of files being received from a plurality of sources. In aspects, the plurality of sources may include, without limitation, files from one or more organizations.

Storing module 218 may be configured to store a single copy of each of the plurality of files comprising the corpus of files. In aspects, storing module 218 may be configured to store an identifier of a source location for at least a portion of the plurality of files comprising the corpus of files. In aspects, storing module 218 may be configured to store a date on which at least a portion of the plurality of files comprising the corpus of files was received by the file corpus generating module 216.

File identifying module 220 may be configured to identify a first file of interest. In aspects, the first file of interest may be a file included in a corpus of files that comprises a plurality of files. In aspects, the first file of interest may be identified, by way of example and not limitation, via a security product alert, a threat intel feed, a YARA rule match, or the like. In aspects, a file of interest may be identified as a file containing a character sequence of interest (e.g., a character sequence comprising a YARA rule).

In aspects, file identifying module 220 may be configured to identify additional files of interest (e.g., a second file of interest). In aspects, additional files of interest may be identified as additional files containing character sequences-of-interest. In aspects, the file identifying module 220 may be configured to identify additional files from the plurality of files comprising the corpus of files that include at least a portion of features extracted from the first file of interest, as more fully described below.

Comparing module 222 may be configured to compare the first file of interest to at least a portion of the plurality of files comprising the corpus of files. In aspects, comparing module 222 may be configured to compare one or more features extracted from the first file of interest to at least a portion of the plurality of files comprising the corpus of files.

Feature extracting module 224 may be configured to extract one or more features from files of interest (e.g., a first file of interest and/or a first file containing a character sequence of interest).

Similarity determining module 226 may be configured to, based on the comparison done by comparing module 222, determine if one or more files from the plurality of files comprising the corpus of files, includes a threshold similarity to the first file of interest. It will be understood and appreciated by those having ordinary skill in the art that the threshold percentage at or under which a file is considered sufficiently similar is configurable and may be any desired threshold. Embodiments of the present disclosure are not intended to be limited to any particular percentage, percentage range, or number.

Displaying module 228 may be configured to cause an identifier of the second file of interest to be displayed.

In some implementations, computing platform(s) 210, remote platform(s) 212, and/or external resources 230 may be operatively linked via one or more electronic communication links, through a communications module 238. Communications module 238 is configured to interface with network 250 to send and receive information, such as data, requests, responses, and commands to other devices via network 250. Communications module 238 can be, for example, modems or Ethernet cards. Computing platform 210 may be a desktop computer, a mobile computer (e.g., a laptop, a palm device, a tablet, or a smart phone), or an AR/VR headset configured to provide an immersive reality experience to a user.

For example, such electronic communication links may be established, at least in part, via a network 250 such as the Internet and/or other networks. It will be appreciated that this is not intended to be limiting, and that the scope of this disclosure includes implementations in which computing platform(s) 210, remote platform(s) 212, and/or external resources 230 may be operatively linked via some other communication media.

A given remote platform 212 may include one or more processors configured to execute computer program modules. The computer program modules may be configured to enable an expert or user associated with the given remote platform 212 to interface with system 200 and/or external resources 230 and/or provide other functionality attributed herein to remote platform(s) 212. By way of non-limiting example, a given remote platform 212 and/or a given computing platform 210 may include one or more of a server, a desktop computer, a laptop computer, a handheld computer, a tablet computing platform, a NetBook, a Smartphone, a gaming console, and/or other computing platforms.

External resources 230 may include sources of information outside of system 200, external entities participating with system 200, and/or other resources. In some implementations, some or all of the functionality attributed herein to external resources 230 may be provided by resources included in system 200.

Computing platform(s) 210 may include electronic storage 232, one or more processors 234, and/or other components. Computing platform(s) 210 may include communication lines, or ports to enable the exchange of information with a network and/or other computing platforms. Illustration of computing platform(s) 210 in FIG. 2 is not intended to be limiting. Computing platform(s) 210 may include a plurality of hardware, software, and/or firmware components operating together to provide the functionality attributed herein to computing platform(s) 210. For example, computing platform(s) 210 may be implemented by a cloud of computing platforms operating together as computing platform(s) 210.

Electronic storage 232 may comprise non-transitory storage media that electronically stores information. The electronic storage media of electronic storage 232 may include one or both of system storage that is provided integrally (e.g., substantially non-removable) with computing platform(s) 210 and/or removable storage that is removably connectable to computing platform(s) 210 via, for example, a port (e.g., a USB port, a firewire port, etc.) or a drive (e.g., a disk drive, etc.). Electronic storage 232 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 232 may include one or more virtual storage resources (e.g., cloud storage, a virtual private network, and/or other virtual storage resources). Electronic storage 232 may store software algorithms, information determined by processor(s) 234, information received from computing platform(s) 210, information received from remote platform(s) 212, and/or other information that enables computing platform(s) 210 to function as described herein.

Processor(s) 234 may be configured to provide information processing capabilities in computing platform(s) 210. As such, processor(s) 234 may include one or more of a digital processor, an analog processor, a digital circuit designed to process information, an analog circuit designed to process information, a state machine, and/or other mechanisms for electronically processing information. Although processor(s) 234 is shown in FIG. 2 as a single entity, this is for illustrative purposes only. In some implementations, processor(s) 234 may include a plurality of processing units. These processing units may be physically located within the same device, or processor(s) 234 may represent processing functionality of a plurality of devices operating in coordination. Processor(s) 234 may be configured to execute modules 216, 218, 220, 222, 224, 226, and/or 228, and/or other modules. Processor(s) 234 may be configured to execute modules 216, 218, 220, 222, 224, 226, and/or 228, and/or other modules by software; hardware; firmware; some combination of software, hardware, and/or firmware; and/or other mechanisms for configuring processing capabilities on processor(s) 234. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 216, 218, 220, 222, 224, 226, and/or 228 are illustrated in FIG. 2 as being implemented within a single processing unit, in implementations in which processor(s) 234 includes multiple processing units, one or more of modules 216, 218, 220, 222, 224, 226, and/or 228 may be implemented remotely from the other modules. The description of the functionality provided by the different modules 216, 218, 220, 222, 224, 226, and/or 228 described below is for illustrative purposes, and is not intended to be limiting, as any of modules 216, 218, 220, 222, 224, 226, and/or 228 may provide more or less functionality than is described. For example, one or more of modules 216, 218, 220, 222, 224, 226, and/or 228 may be eliminated, and some or all of its functionality may be provided by other ones of modules 216, 218, 220, 222, 224, 226, and/or 228. As another example, processor(s) 234 may be configured to execute one or more additional modules that may perform some or all the functionality attributed below to one of modules 216, 218, 220, 222, 224, 226, and/or 228.

The techniques described herein may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

Figure 3:
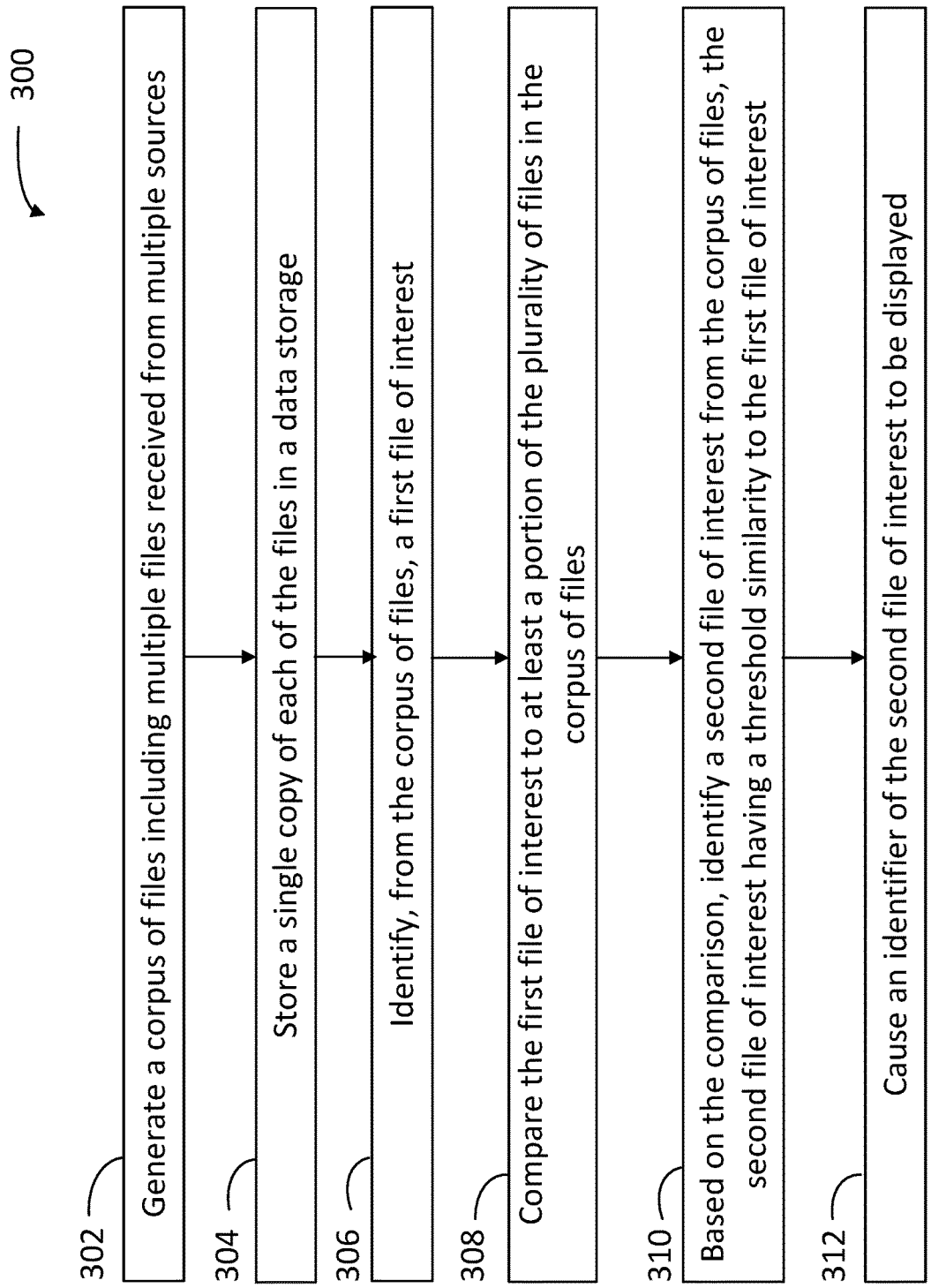
FIG. 3 illustrates an exemplary flow diagram for using files of interest to identify similar files contained in a pre-collected corpus of files, in accordance with one or more implementations of the present disclosure.

FIG. 3 illustrates an exemplary flow diagram (e.g., process 300) for using files of interest to identify similar files contained in a pre-collected corpus of files, according to certain aspects of the disclosure. For explanatory purposes, the exemplary process 300 is described herein with reference to FIG. 2. Further for explanatory purposes, the steps of the exemplary process 300 are described herein as occurring in serial, or linearly. However, multiple instances of the exemplary process 300 may occur in parallel in different order, simultaneously, quasi-simultaneously, or overlapping in time. At least one or more of the steps in process 300 may be performed by a processor executing machine-readable instructions in one of a file corpus generating module, a storing module, a file identifying module, a comparing module, a similarity determining module, and a displaying module, as disclosed herein (e.g., processor 234, machine-readable instructions 214, file corpus generating module 216, storing module 218, file identifying module 220, comparing module 222, similarity determining module 226, and displaying module 228). The files in process 300 may be stored in an electronic storage and exchanged with external resources or remote platforms via a communications module through a network, as disclosed herein (e.g., electronic storage 232, external resources 230, remote platform 212, communications module 238, and network 250).

At step 302, process 300 includes generating a corpus of files including a plurality of files, the plurality of files being received from a plurality of sources, e.g., utilizing file corpus generating module 216 of the system 200 of FIG. 2.

At step 304, process 300 includes storing a single copy of each of the plurality of files in a data storage, e.g., utilizing storing module 218 of the system 200 of FIG. 2.

At step 306, process 300 includes identifying a first file of interest, e.g., utilizing the file identifying module 220 of the system 200 of FIG. 2. In some embodiments, the first file of interest is one of a suspicious file and a malicious file. In some embodiments, step 306 includes one of receiving an alert from a security product identifying the first file of interest, receiving an identifier of the first file of interest from a threat intel feed, and receiving a match of a character sequence contained in the first file of interest to a YARA rule.

At step 308, process 300 includes comparing the first file of interest to at least a portion of the plurality of files comprising the corpus of files, e.g., utilizing the comparing module 222 of the system 200 of FIG. 2.

At step 310, process 300 includes, based on the comparing, identifying at least a second file of interest, from the plurality of files comprising the corpus of files, that includes a threshold similarity to the first file of interest, e.g., utilizing the similarity determining module 226 of the system 200 of FIG. 2. In some embodiments, the second file of interest is one of a suspicious file and a malicious file. In some embodiments, step 310 includes moving the first file of interest and the second file of interest to a quarantine sector in the data storage, and preventing access to the quarantine sector from an external resource. In some embodiments, the threshold similarity includes a character sequence of interest, and step 310 includes updating the threshold similarity with a second character sequence from the second file of interest. In some embodiments, step 310 includes identifying a malicious source based on a provenance of the first file of interest and of the second file of interest. In some embodiments, step 310 includes identifying a remote network server as a source of the first file of interest and of the second file of interest. In some embodiments, step 310 includes alerting a network administrator to quarantine at least one of the sources of the first file of interest and of the second file of interest.

At step 312, process 300 includes causing an identifier of the second file of interest to be displayed, e.g., utilizing the displaying module 228 of the system 200 of FIG. 2. In some embodiments, step 312 includes extracting one or more features from the first file of interest, and comparing the one or more features from the first file of interest with at least the portion of the files in the corpus of files.

Figure 4:
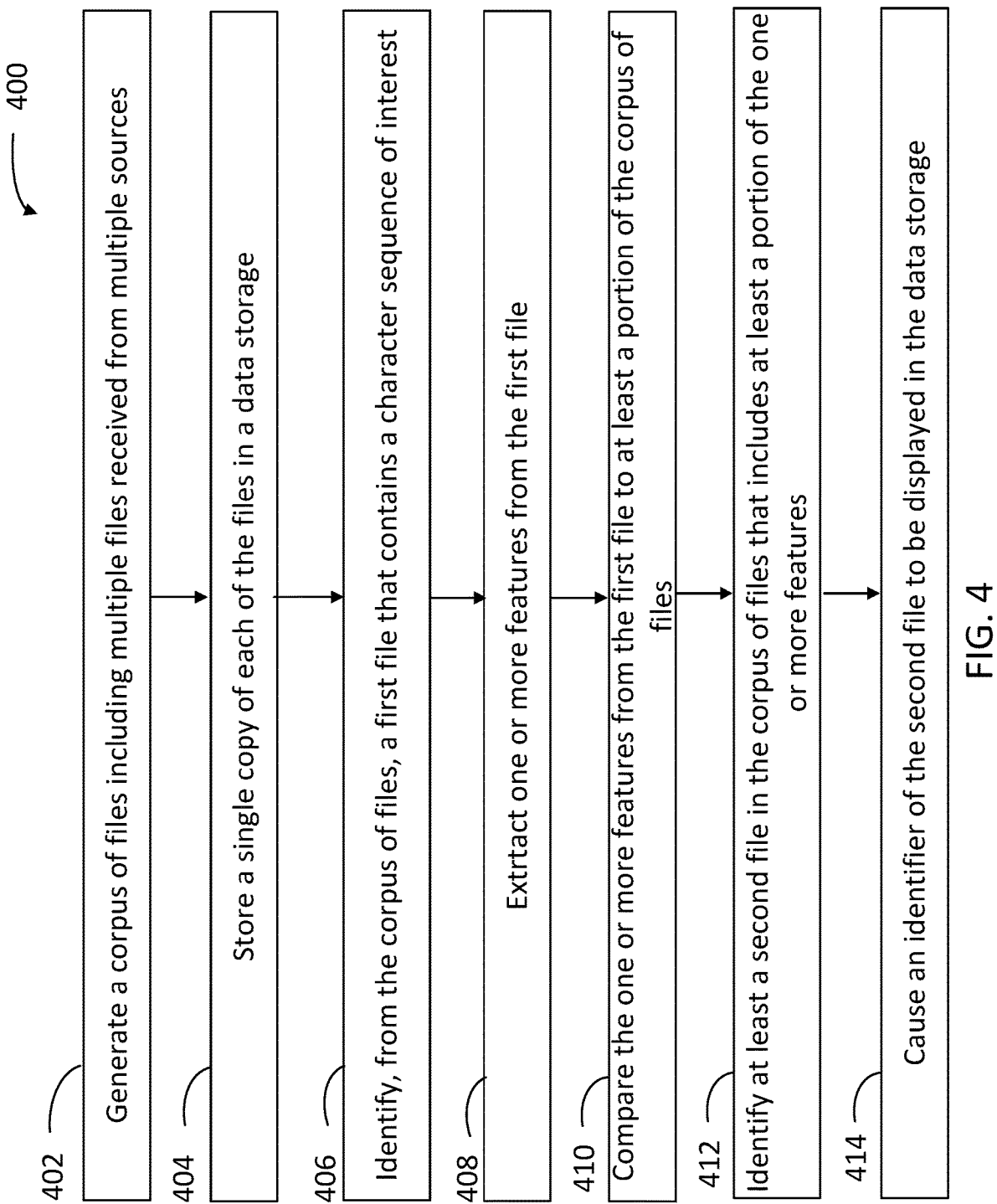
FIG. 4 illustrates an exemplary flow diagram for using files of interest to identify similar files contained in a pre-collected corpus of files, in accordance with one or more implementations of the present disclosure.

FIG. 4 illustrates an exemplary flow diagram (e.g., process 400) for using files of interest to identify similar files contained in a pre-collected corpus of files, according to certain aspects of the disclosure. For explanatory purposes, the exemplary process 400 is described herein with reference to FIG. 2. Further for explanatory purposes, the steps of the exemplary process 400 are described herein as occurring in serial, or linearly. However, multiple instances of the exemplary process 400 may occur in parallel in different order, simultaneously, quasi-simultaneously, or overlapping in time. At least one or more of the steps in process 400 may be performed by a processor executing machine-readable instructions in one of a file corpus generating module, a storing module, a file identifying module, a comparing module, a similarity determining module, and a displaying module, as disclosed herein (e.g., processor 234, machine-readable instructions 214, file corpus generating module 216, storing module 218, file identifying module 220, comparing module 222, similarity determining module 226, and displaying module 228). The files in process 400 may be stored in an electronic storage and exchanged with external resources or remote platforms via a communications module through a network, as disclosed herein (e.g., electronic storage 232, external resources 230, remote platform 212, communications module 238, and network 250).

At step 402, process 400 may include generating a corpus of files including a plurality of files, the plurality of files being received from a plurality of sources, e.g., utilizing file corpus generating module 216 of the system 200 of FIG. 2.

At step 404, process 400 includes storing a single copy of each of the plurality of files in a data storage, e.g., utilizing storing module 218 of the system 200 of FIG. 2.

At step 406, process 400 includes identifying a first file that contains a character sequence of interest, e.g., utilizing file identifying module 220 of the system 200 of FIG. 2. In some embodiments, the first file is one of a suspicious file and a malicious file. In some embodiments, step 406 includes one of receiving an alert from a security product identifying the first file, receiving an identifier of the first file from a threat intel feed, and receiving a match of the character sequence of interest to a YARA rule.

At step 408, process 400 includes extracting one or more features from the first file, e.g., utilizing the feature extracting module 224 of the system 200 of FIG. 2. In some embodiments, step 408 includes extracting one or more features from the first file, the one or more processors executing instructions to extract a metadata associated with the first file.

At step 410, process 400 includes comparing the one or more features extracted from the first file to at least a portion of the plurality of files comprising the corpus of files, e.g., utilizing the comparing module 222 of the system 200 of FIG. 2.

At step 412, process 400 includes identifying at least a second file from the plurality of files comprising the corpus of files that includes at least a portion of the extracted one or more features, e.g., utilizing the file identifying module 220 of the system 200 of FIG. 2. In some embodiments, the second file is one of a suspicious file and a malicious file. In some embodiments, the one or more processors execute instructions to move the first file of interest and the second file of interest to a quarantine sector in the data storage, and step 412 includes preventing access to the quarantine sector from an external resource. In some embodiments, the one or more processors execute instructions to update the character sequence of interest with a second character sequence from the second file of interest. In some embodiments, the one or more processors further execute instructions to identify a malicious source based on a provenance of the first file of interest and of the second file of interest. In some embodiments, the one or more processors further execute instructions to identify a remote network server as a source of the first file of interest and of the second file of interest. In some embodiments, the one or more processors further execute instructions to generate an alert to a network administrator to quarantine at least one of the sources of the first file of interest and of the second file of interest.

At step 414, process 400 includes causing an identifier of the second file to be displayed in the data storage, e.g., utilizing displaying module 228 of the system 200 of FIG. 2.

Hardware Overview

Figure 5:
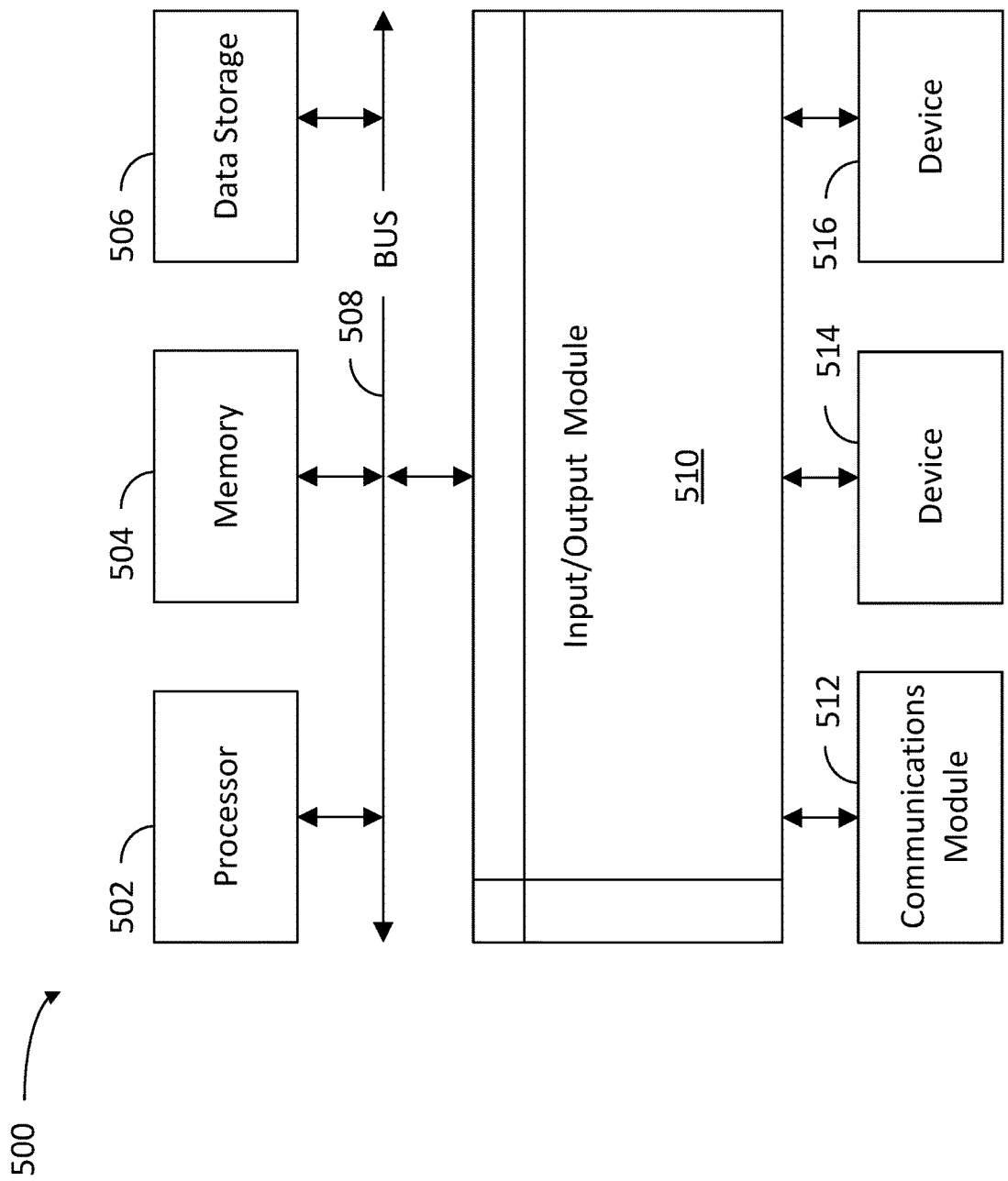
FIG. 5 is a block diagram illustrating an exemplary computer system (e.g., representing both client and server) with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, e.g., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The technology is illustrated, for example, according to various aspects described below. Various examples of aspects of the subject technology are described as numbered claims (claim 1, 2, etc.) for convenience. These are provided as examples and do not limit the subject technology.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for identifying files of interest, comprising:
   generating a corpus of files including multiple files received from multiple sources;
   storing a single copy of each of the files in a data storage;
   identifying, from the corpus of files, a first file of interest;
   comparing the first file of interest to at least a portion of the files in the corpus of files;
   identifying a second file of interest in the corpus of files, the second file of interest having a threshold similarity to the first file of interest, the threshold similarity comprising a first character sequence of interest;
   extracting a second character sequence from the second file of interest, wherein the first character sequence and the second character sequence are distinct;
   updating the threshold similarity based on the second character sequence extracted from the second file of interest; and
   causing an identifier of the second file of interest to be displayed.

2. The computer-implemented method of claim 1, wherein the first file of interest is one of a suspicious file and a malicious file.

3. The computer-implemented method of claim 1, wherein the second file of interest is one of a suspicious file and a malicious file.

4. The computer-implemented method of claim 1, further comprising moving the first file of interest and the second file of interest to a quarantine sector in the data storage, and preventing access to the quarantine sector from an external resource.

5. The computer-implemented method of claim 1, further comprising identifying a malicious source based on a provenance of the first file of interest and of the second file of interest.

6. The computer-implemented method of claim 1, further comprising identifying a remote network server as a source of the first file of interest and of the second file of interest.

7. The computer-implemented method of claim 1, further comprising alerting a network administrator to quarantine at least one of the sources of the first file of interest and of the second file of interest.

8. The computer-implemented method of claim 1, wherein identifying the first file of interest comprises one of receiving an alert from a security product identifying the first file of interest, receiving an identifier of the first file of interest from a threat intel feed, and receiving a match of a character sequence contained in the first file of interest to a YARA rule.

9. The computer-implemented method of claim 1, further comprising: extracting one or more features from the first file of interest, and wherein comparing the first file of interest to at least a portion of the files in the corpus of files comprises comparing the one or more features from the first file of interest with at least the portion of the files in the corpus of files.

10. A system configured for using files containing character sequences of interest to identify similar files, comprising:
    one or more processors configured by machine-readable instructions to:
       generate a corpus of files including multiple files received from multiple sources;
       store a single copy of each of the files in a data storage;
       identify a first file that contains a character sequence of interest;
       extract one or more features from the first file, the one or more features comprising a first character sequence;
       compare the one or more features from the first file to at least a portion of the files in the corpus of files;
       identify at least a second file from the files in the corpus of files that includes the first character sequence;
       extract a second character sequence from the second file, wherein the first character sequence and the second character sequence are distinct, and wherein the second character sequence is included in the one or more features used to compare subsequent files in the corpus of files; and cause an identifier of the second file to be displayed.

11. The system of claim 10, wherein the first file is one of a suspicious file and a malicious file.

12. The system of claim 10, wherein the second file is one of a suspicious file and a malicious file.

13. The system of claim 10, wherein identifying the first file comprises one of receiving an alert from a security product identifying the first file, receiving an identifier of the first file from a threat intel feed, and receiving a match of the character sequence of interest to a YARA rule.

14. The system of claim 10, wherein the one or more processors execute instructions to move the first file of interest and the second file of interest to a quarantine sector in the data storage, and prevent access to the quarantine sector from an external resource.

15. The system of claim 10, wherein the one or more processors further execute instructions to identify a malicious source based on a provenance of the first file of interest and of the second file of interest.

16. The system of claim 10, wherein the one or more processors further execute instructions to identify a remote network server as a source of the first file of interest and of the second file of interest.

17. The system of claim 10, wherein the one or more processors further execute instructions to generate an alert to a network administrator to quarantine at least one of the sources of the first file of interest and of the second file of interest.

18. The system of claim 10, wherein to extract one or more features from the first file, the one or more processors execute instructions to extract a metadata associated with the first file.

\* \* \* \* \*